United States Patent [19]
Cryder et al.

[11] Patent Number: 5,959,668
[45] Date of Patent: Sep. 28, 1999

[54] AUTOMATIC EXPOSURE AND GAIN CONTROL FOR A SENSOR USING VIDEO FEEDBACK

[75] Inventors: Michael Eugene Cryder, N. Canton; Dale Robert Sebok, Tallmadge; H. John Tatko, Stow, all of Ohio

[73] Assignee: Lockheed Martin Tactical Defense Systems, Inc., Akron, Ohio

[21] Appl. No.: 08/721,064

[22] Filed: Sep. 26, 1996

[51] Int. Cl.⁶ .......................... H04N 5/235; H04N 5/225; H04N 5/238; H04N 5/222

[52] U.S. Cl. .......................... 348/229; 348/217; 348/364; 348/372

[58] Field of Search ..................................... 348/224, 227, 348/217, 216, 362, 364, 370, 371, 229, 336

[56] References Cited

U.S. PATENT DOCUMENTS

| | | |
|---|---|---|
| 4,603,250 | 7/1986 | Contini et al. ........................... 350/213 |
| 4,851,914 | 7/1989 | Pfanhouser et al. ................ 358/213.19 |
| 5,001,552 | 3/1991 | Okino ......................................... 358/29 |
| 5,027,215 | 6/1991 | Takayama et al. ................. 358/213.11 |
| 5,473,374 | 12/1995 | Shimizu et al. .......................... 348/363 |
| 5,563,653 | 10/1996 | Floryan ................................... 348/217 |
| 5,606,392 | 2/1997 | Tintera et al. ........................... 396/161 |

FOREIGN PATENT DOCUMENTS 2086687  7/1981  United Kingdom .

*Primary Examiner*—Wendy Garber
*Assistant Examiner*—Jacqueline Wilson
*Attorney, Agent, or Firm*—Renner, Kenner, Greive, Bobak, Taylor & Weber

[57] ABSTRACT

An apparatus for viewing dimly illuminated and rapidly changing scenes includes a sensor assembly which generates a video signal. The apparatus further includes a controller which receives the video signal for comparison to a desired average video value whereupon the controller adjusts at least one adjustable variable contained within the sensor assembly. The sensor assembly includes a lens which has an adjustable iris and an image intensification tube which includes a photocathode and a micro-channel plate. The photocathode has an adjustable photocathode gate pulse-width and the micro-channel plate has an adjustable micro-channel plate gain. A strobe is also provided to illuminate the scene viewed by the sensor assembly wherein the strobe is connected to a processor which is also connected to the controller. The controller determines what the ambient light level is to be at the next illuminated or non-illuminated scene and adjusts the adjustable variables accordingly.

10 Claims, 4 Drawing Sheets

5,959,668

AUTOMATIC EXPOSURE AND GAIN CONTROL FOR A SENSOR USING VIDEO FEEDBACK

TECHNICAL FIELD

The invention herein resides generally in the art of image sensors that generate a video output. More particularly, the present invention relates to image sensors employed in low ambient light areas in which rapidly changing scenes are viewed. Specifically, the present invention relates to an image sensor which employs a lens coupled to an image intensification tube wherein the image sensor has at least one automatically adjusted variable for enhancing the video output.

BACKGROUND ART

Image sensors and in particular video sensors with image intensification tubes are employed in low light areas to monitor scenes with minimal or no illumination. For example, such image sensors may be used for night-time surveillance cameras in high crime areas, for hand-held video camcorders which operate without aid of attached illumination devices or in conjunction with aerial drones which view a scene to confirm the location thereof. These sensors produce an image of a scene with enhanced brightness without introducing spurious brightness variations or noise therein.

Unfortunately, these aforementioned sensors are ineffective where a bright contrasting light enters the scene or where rapidly changing scenery is viewed. A bright light in a previously dimly-lit scene causes video images to smear and become distorted. Rapidly changing scenes, which occur with drone-mounted sensors, are incapable of quickly adjusting to the varying light levels viewed by the sensor. In other words, contrasting artificial light sources tend to integrate and obscure images without providing any additional features in the image. This problem is further exacerbated in drones which employ temporary illumination to confirm their in-flight position.

One attempt to overcome this problem is to perform an integration operation on the current supplied to the image intensification tube by using only a part of each image to set operational characteristics. However, this approach employs only the image intensification tube in the compensation loop and does not consider the operational parameters of the tube or other components within the sensor. Moreover, each component within a sensor must be individually calibrated for its particular operating characteristics to obtain a useable output. Of course, this adds cost and production time to the manufacture of the sensor. Additionally, the output of known sensors may be adversely affected by degradation of a single component therein.

Based upon the foregoing it is apparent that there is a need in the art for a sensor which automatically maintains the desired operational parameters in video imagery while the sensor is viewing dimly lit and/or rapidly changing scenes. Moreover, there is a need in the art for a sensor which is self-adjusting to view scenes that are periodically illuminated.

DISCLOSURE OF INVENTION

In light of the foregoing, it is a first aspect of the present invention to provide an automatic exposure and gain control for an image intensified sensor using digital video feedback.

Another aspect of the present invention is to provide an apparatus which automatically maintains the desired signal to noise ratio and contrast in video imagery while scene characteristics are rapidly changing in a video sensor's field of view.

Still a further aspect of the present invention, as set forth above, is to compensate for variations in components contained within the sensor.

Still yet another aspect of the present invention, as set forth above, is to provide circuitry which optimizes the viewing of scenes with minimal ambient light.

An additional aspect of the present invention, as set forth above, is to provide a sensor assembly with adjustable variables that optimize the brightness level of a video output.

Still yet another aspect of the present invention, as set forth above, is to provide the sensor assembly with a lens which has an adjustable iris.

Yet a further aspect of the present invention, as set forth above, is to provide the sensor assembly with an image intensification tube that includes a photocathode which has an adjustable photocathode pulsewidth and a micro-channel plate which has an adjustable micro-channel plate gain.

Still a further aspect of the present invention is to provide a strobe which illuminates the scene and where adjustments are made by the sensor assembly for viewing both the illuminated and non-illuminated scenes.

The foregoing and other aspects of the invention which should become apparent as the detailed description proceeds are achieved by an automatic exposure and gain control for a sensor using video feedback, comprising: a sensor assembly viewing a scene and generating a video signal, a sensor having at least one adjustable variable; and a controller receiving the video signal and deranging an average video value which is compared to a desired average video value, the controller adjusting the at least one adjustable variable to equalize the average video value with the desired average video value.

Another aspect of the invention which shall become apparent as obtained by an apparatus for enhancing a scene viewed by an image capturing device, comprising: means for capturing an image having a lens coupled to an image intensifier tube, a lens having an adjustable iris and the image intensifier tube having at least one adjustable variable, the capturing means generating a video signal of the image; and means for controlling the capturing means receiving the video signal for generating an average video value which is compared to a desired average video value, the controlling means adjusting one of the adjustable iris and the at least one adjustable variable to equalize the average video value with the desired average video value.

Other aspects of the invention which will become apparent herein are obtained by a method for maintaining a desired contrast in video imagery, comprising the steps of: acquiring a plurality of video images of a scene at a first predetermined rate with a sensor having at least one adjustable variable; determining an average video level from the plurality of video images and a compiled video history; adjusting the at least one adjustable variable according to the difference between the average video level and a desired average video level to generate a video signal with a desired contrast level; and compiling the video history from the plurality of video images and the corresponding adjustments made thereto.

BRIEF DESCRIPTION OF THE DRAWINGS

For a complete understanding of the objects, techniques, and structure of the invention, reference should be made to the following detailed description and the accompanying drawings wherein.

BEST MODE FOR CARRYING OUT THE INVENTION

Figure 1:
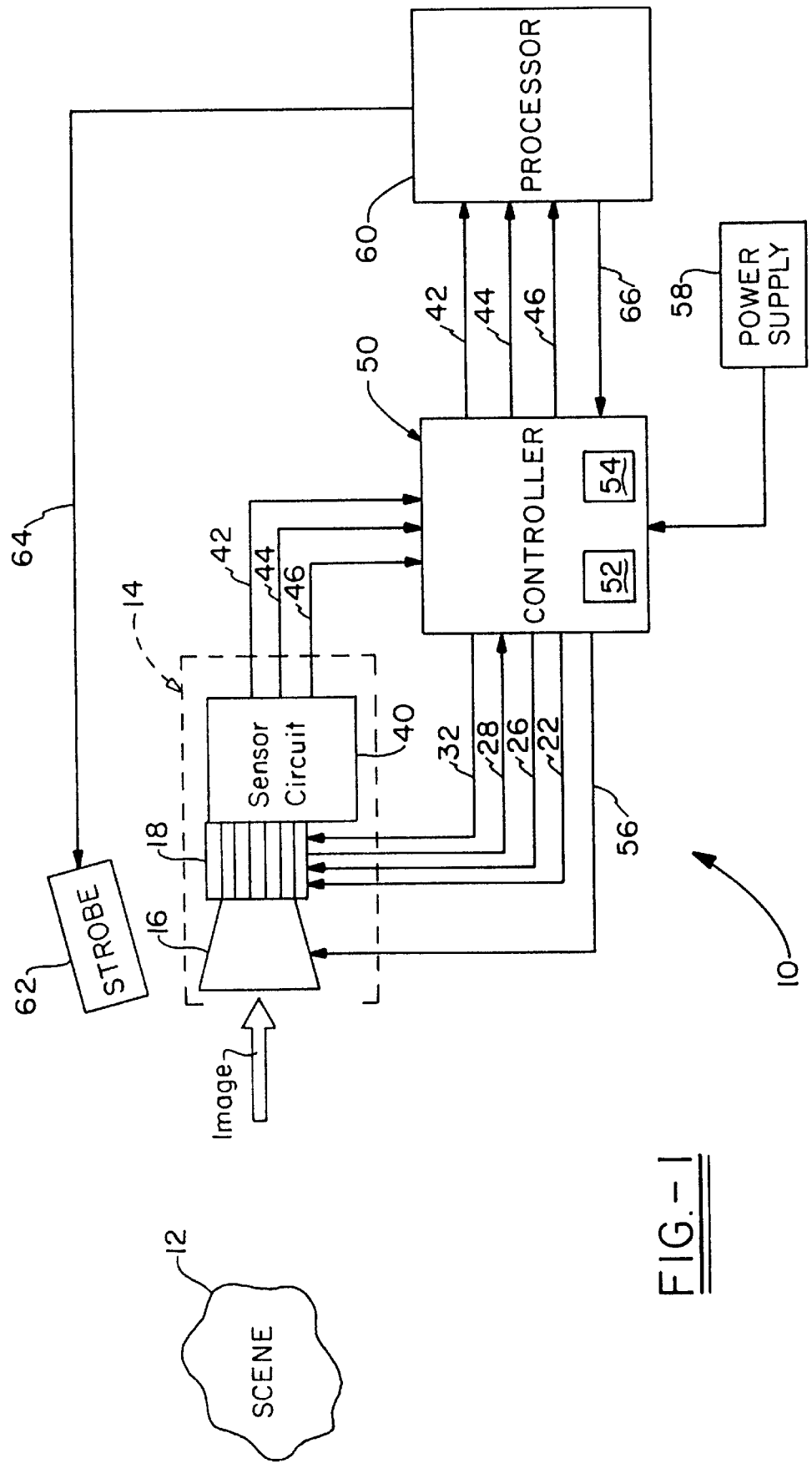
FIG. 1 is a schematic view of the present invention.
Figure 2:
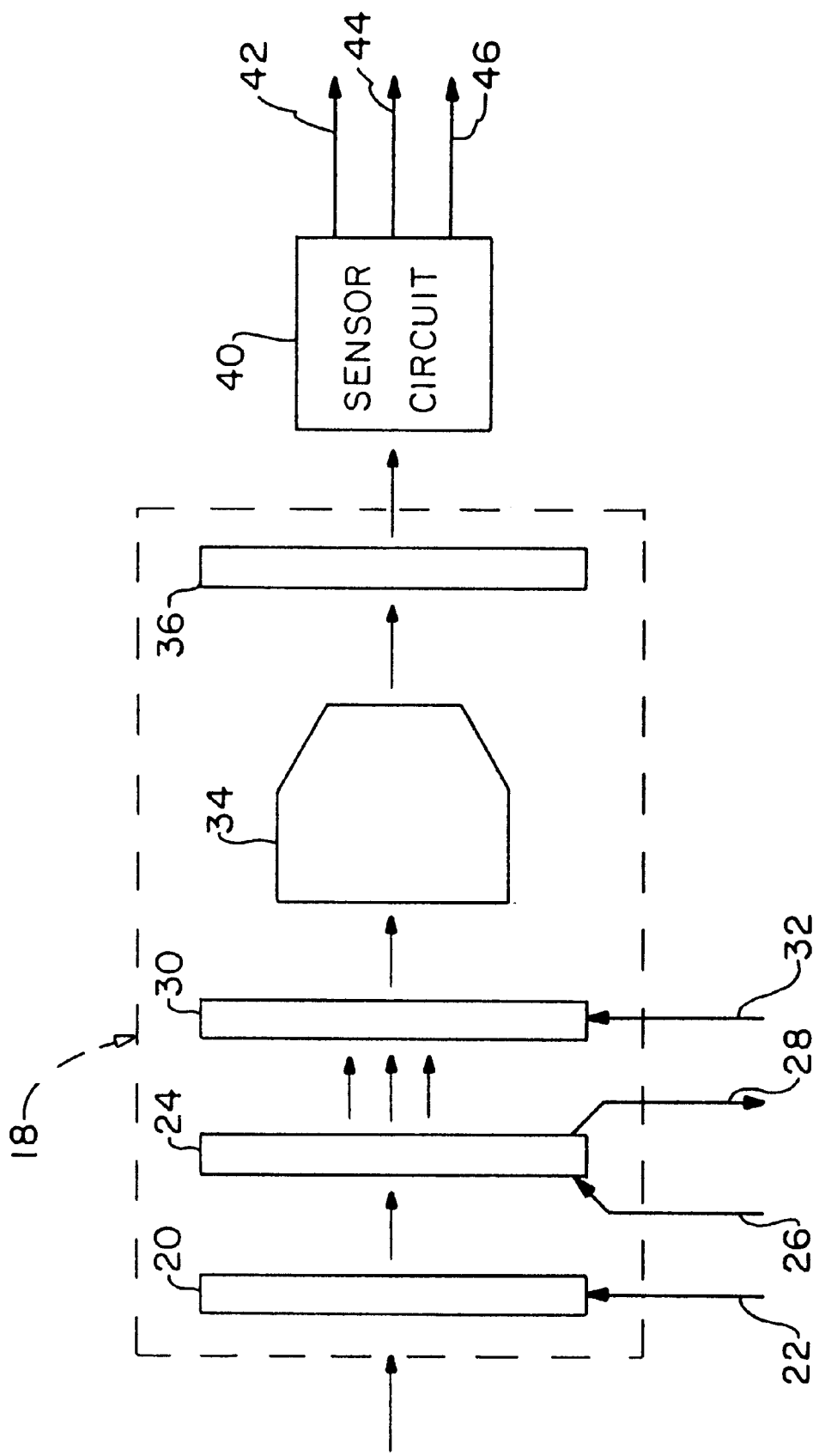
FIG. 2 is a schematic view of an image intensification tube according to the present invention.

Referring now to the drawings and more particularly FIGS. 1 and 2, it can be seen that an apparatus for enhancing a scene viewed by an image capturing device is designated generally by the numeral 10. As shown, a scene 12 is viewed by the apparatus 10, wherein the scene is typically exposed to minimal light and is not easily discernable by the human eye. Moreover, the scene 12 may include sharply contrasting bright lights that tend to saturate other features therein. The apparatus 10 may be employed on a stationary fixed platform or upon a moving platform, such as a drone.

The apparatus 10 includes a sensor assembly 14 which captures video images at a rate of about 60 hertz. Included in the sensor assembly 14 is a lens 16 which has an adjustable iris. In the preferred embodiment, the lens 16 is a 50 mm video camera with a variable f-stop. It will be appreciated that other lenses could be employed. An image intensification tube 18 is coupled to the lens 16 for the purpose of brightening the image captured by the lens 16. As is well known in the art, the lens 16 captures photons of light for amplification by the image intensification tube 18.

As seen in FIG. 2, the image intensification tube 18 includes a photocathode 20 which is adjusted by a photocathode gate pulsewidth 22 that is variable between about positive 40 volts to about negative 800 volts. The photocathode 20 functions as a shutter that opens and closes based on the value of the photocathode gate pulsewidth 22 to convert the photons viewed by the lens 16 to electrons. Therefore, any available light within the image may be increased or decreased by adjusting the photocathode gate pulsewidth 22. A micro-channel plate 24 is coupled to the photocathode 20 for the purpose of multiplying the electrons received thereby and further amplifying the ambient light contained within the scene 12. The micro-channel plate 24 receives an adjustable micro-channel plate gain 26, which ranges from about negative 550 volts to about negative 950 volts, to variably adjust the number of electrons generated. The micro-channel plate 24 generates a micro-channel plate output signal 28 whose use is described later in the specification. A phosphor screen 30 is coupled to the micro-channel plate 24 for the purpose of converting the multiplicity of electrons to a multiplicity of photons. The phosphor screen 30 includes an output ground connection 32. A fiber optic coupler 34 is coupled to the phosphor screen 30 and functions to funnel the multiplicity of photons to a charge coupled device (CCD) 36. A sensor circuit 40 receives the photons from the CCD 36 and converts the image from the image intensification tube 18 to a digital image with all of the necessary signal processing characteristics required for sensing the video image. In particular, the sensor circuit 40 generates a horizontal synchronization pulse 42, a vertical synchronization pulse 44 and a video signal 46. As those skilled in the art will appreciate, the horizontal synchronization pulse 42 is the beginning of a video line and a vertical synchronization pulse 44 indicates the top of the video field. The video signal 46 may be an analog or digital signal that is ultimately viewed by the end user or connected sensing device. The connected sensing device may be a video monitor or a device which compares the image to a stored image to confirm or correlate the position of the sensor.

A controller 50 receives the signals 42–46 and derives an average video value of the video frames captured by the sensor assembly 14. The controller 50 includes a power regulation circuit 52 and an automatic exposure circuit 54. The controller 50, as will be described in detail hereinbelow, generates the photocathode gate pulsewidth 22 and the micro-channel plate gain 26. The controller 50 also receives the phosphor screen ground 32 and the micro-channel plate output 28. The controller 50 also generates an iris control signal 56 that controls the opening and closure of the iris 16. A power supply 58 is connected to the controller 50 and in particular the power regulation circuit 52 to provide the necessary power voltages and operational voltages for the controller 50. The controller 50 may be implemented on a Xilinx XC4005, a Xilinx XC4010 or like device.

A processor 60, through the controller 50, receives the signals 42–46 and synchronizes operation of the controller 50 with a strobe 62. As those skilled in the art will appreciate, the strobe 62 may be of a xenon type which illuminates the scene at a predetermined rate of about 10 hertz. The strobe 62 is sequenced by a flash signal 64 from the processor 60 which also generates an illumination gate signal 66 so that the controller 50 can adjust the variables within the sensor assembly 14 whenever the strobe 62 illuminates the scene 12. The strobe 62 may be employed in high speed guidance applications which normally limit the time permitted for video integration. Extended integration time, also referred to as long photocathode pulsewidth, ultimately results in image smearing. By periodically illuminating the scene 12 with the strobe 62 the problem with image smearing is eliminated.

Generally, the sensor assembly 14 views the scene 12 and generates the video signal 46 which is received by the controller 50. The controller 50 derives an average video value which is compared to a desired average video value with the difference therebetween being used to adjust at least one of the adjustable variables such as the photocathode gate pulsewidth 22, the micro-channel plate gain 26 or the iris control signal 56. These adjustments increase or decrease the amount of ambient light included with the image captured by the sensor assembly 14 to optimize the viewing thereof. In other words, the controller 50 equalizes the average video value with the desired average video value.

Figure 3:
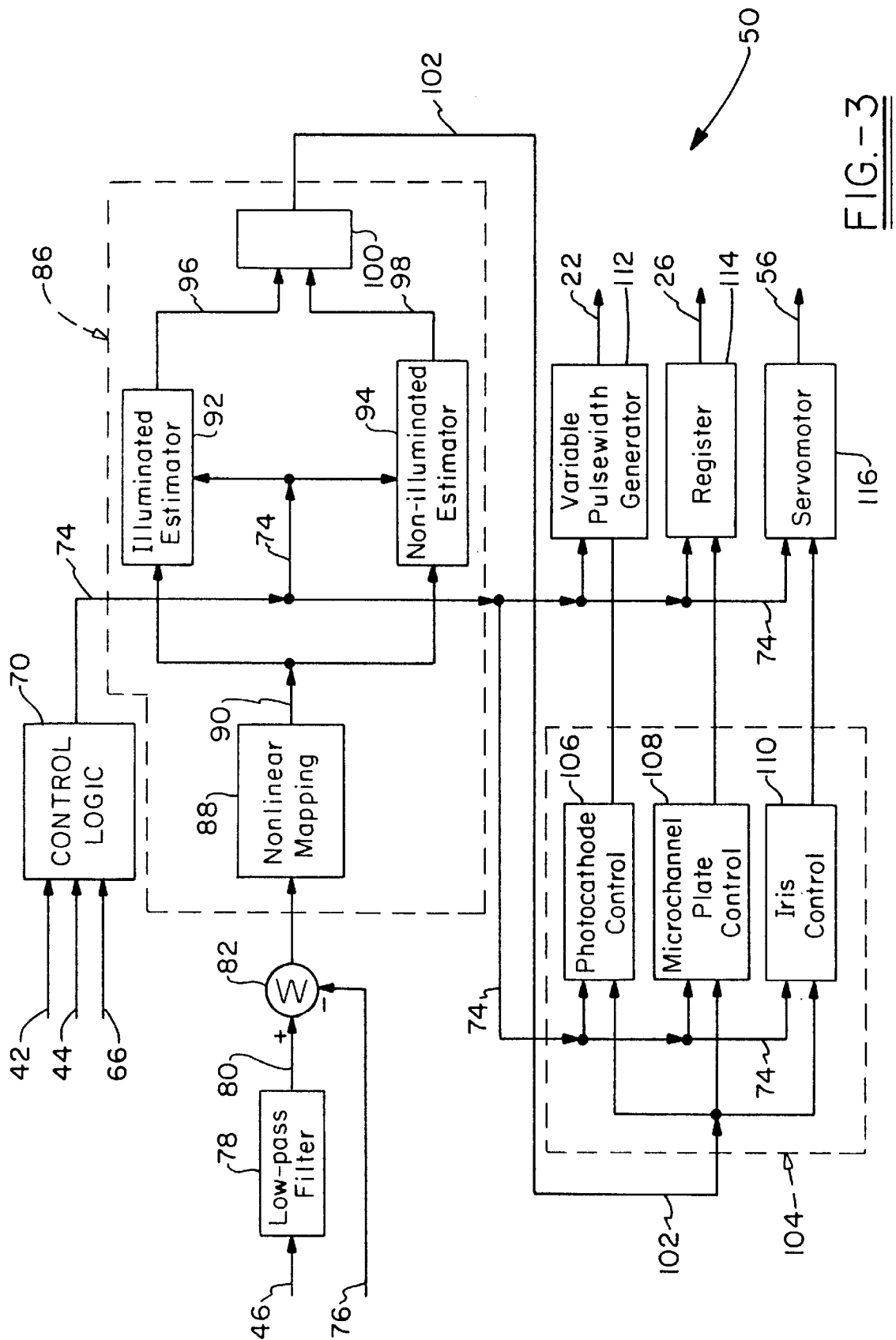
FIG. 3 is a schematic view of a controller according to the present invention.

Referring now to FIG. 3, a detailed explanation of the operation of the controller 50 is presented. The controller 50 includes a control logic circuit 70 which determines when the strobe 62 is going to flash. In particular, the control logic circuit 70 receives the synchronization pulses 42 and 44 and the illumination gate signal 66 for the purpose of generating a control logic output signal 74. Various circuits within the controller 50 use the output signal 74 for the purpose of signaling when the strobe 62 is about to flash and for coordinating when the variables are to be adjusted for a new frame of video.

The controller 50 receives the video signal 46 through a low pass filter 78 to eliminate false variations in the image. In particular, thermal noise from the image intensification tube 18 and the non-image signal variations generated by interference within the sensor assembly 14 are eliminated by the filter 78. Those skilled in the art will appreciate that the components within the sensor assembly 14 are especially susceptible to variations due to the limited amount of ambient light received by the sensor assembly 14. The low pass filter 78 generates a filtered video signal 80 which is received by a comparator 82 for comparison to a video set point signal 76 which is pre-programmed into the controller 50 and which sets the desired average video value for optimum viewing of the scene 12. The comparator 82 generates a difference signal 84 between the video set point signal 76 and the filtered video signal 80 that is received by a state machine 86.

The state machine 86 includes a non-linear mapping circuit 88 which averages the difference signal 84 for the entire field of video and generates a corresponding output signal 90 that is split and received by an illuminated estimator 92 and a non-illuminated estimator 94. Based on the ambient light levels, the illuminated estimator 92 generates an illuminated output signal 96 that is an estimate of what the light level of the scene 12 will be when the strobe 62 flashes based upon previous frames of video and strobe flashes. Likewise, the non-illuminated estimator 94 generates a non-illuminated output signal 96 that is an estimate of the ambient light level of the scene 12 based upon previous non-illuminated frames of videos. Both the signals 96 and 98 are received by a multiplexer 100 which combines the signals to generate a state machine output signal 102 that is received by a control law circuit 104.

The control law circuit 104 comprises a photocathode control circuit 106, a micro-channel plate control circuit 108 and an iris control circuit 110. The control law circuit 104 determines which adjustable components within the sensor assembly 14 are to be adjusted according to the light levels of the scene 12 to optimize the brightness and contrast of the video signal 46. In the preferred embodiment, the photocathode control 106, the micro-channel plate control 108 and the iris control 110 receive the state variable output signal 102 such that the micro-channel plate gain 26 is maintained at a nominal low level as a first requirement. This is done to minimize the video noise contribution by keeping the gain for the micro-channel plate 24 as low as possible for as long as possible. Next, the control law circuit 104 adjusts the iris control circuit 110 between its minimum and maximum values. Finally, the photocathode control circuit 106 adjusts the photocathode pulsewidth over its range of values. After the iris control circuit 110 and the photocathode control circuit 106 have exhausted their ranges of values to optimize viewing of the scene 12, the control law circuit 104 adjusts the micro-channel plate gain 26 to a next minimal value and then readjusts the iris and the photocathode gate pulsewidth as described above. Depending on the particular application, the hierarchy of the control law circuit 104 may be re-configured to adjust the variable components within the sensor assembly 14 in another manner. For example, the iris control 110 may be maintained at a predetermined level and will not be adjusted until the other variable ranges are exhausted.

The photocathode control circuit 106 is connected to a variable pulsewidth generator 112 which generates the photocathode gate pulsewidth 22. The micro-channel plate control 108 is connected to a register 114 which in turn generates the micro channel plate gain 26. The register 114 functions to update the micro-channel plate gain 26 at predetermined intervals with respect to the vertical and horizontal synchronization pulses 42 and 44, respectively. The iris control circuit 110 is connected to a servo-motor 116 which generates the iris control signal 56. The servo-motor 116 functions to open and close the iris 16 as required by the control law circuit 104.

Figure 4:
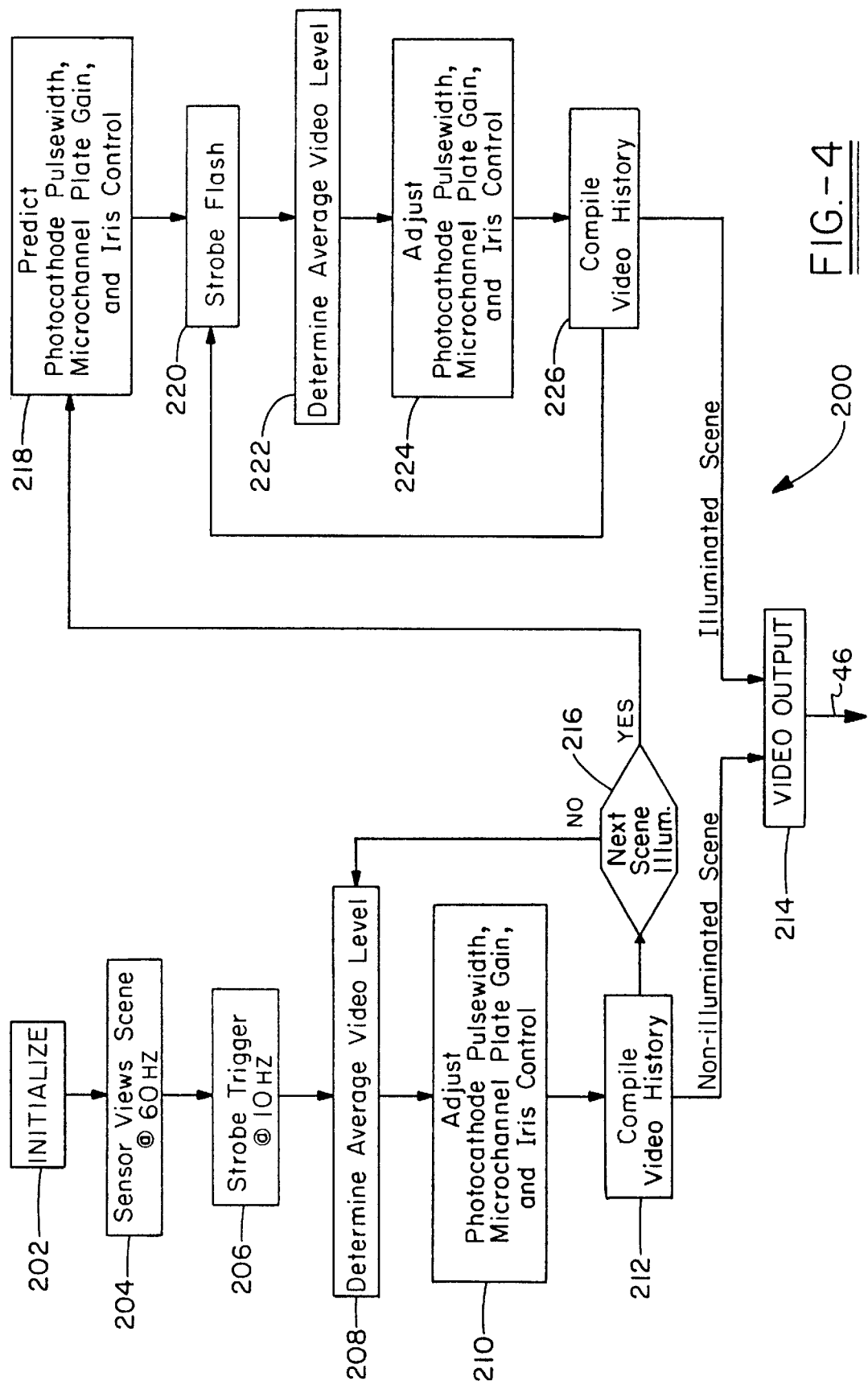
FIG. 4 is a top level flow chart illustrating the operational sequence of the present invention.

Reference is now made to FIG. 4 which provides an overall operational flow 200 of the apparatus 10. At step 202, the apparatus 10 is initialized and all of the adjustable variables (the photocathode gate pulsewidth 22, the micro-channel plate gain 26 and the iris control 56) are set to nominal values. At step 204, the sensor assembly 14 begins viewing the scene 12 at an imaging rate of about 60 hertz. Likewise, at step 206 the strobe 62 is triggered by the processor 60 to flash at a frequency of about 10 hertz. At step 208, the controller 50 determines the average video level of the video signal 46 and based upon this information, at step 210 adjusts the photocathode gate pulsewidth 22, the micro-channel plate gain 26 and the iris control signal 56 to optimize the light level in the next frame of video. At step 212, the controller 50 compiles a video history which provides a basis for making future adjustments to the variable devices within the sensor assembly 14. At step 214, the non-illuminated video scene is passed along and provided as the video output signal 46.

At step 216, the controller 50 determines whether the next scene to be viewed by the sensor assembly 14 is to be illuminated by the strobe 62. If the next scene is not to be illuminated, the controller 50 returns to step 208 and steps 210 and 212 are repeated. However, if at step 216 it is determined that the next scene is to be illuminated, the controller proceeds to step 218, whereupon a prediction is made of the photocathode gate pulsewidth 22, the micro-channel plate gain 26 and the iris control signal 56. At step 220, the strobe 62 is flashed and an illuminated average video level is determined at step 222. Accordingly, at step 224, the controller 50 adjusts the photocathode pulsewidth 22, the micro-channel plate gain 26 and the iris control 56 to prepare for the next occurrence of a strobe flash. At step 226, a video history of the illuminated scenes is compiled and is employed in conjunction with the predicted values derived in step 218 at the next occurrence of the strobe flash at step 220. The compiled video history is also provided to the video output step 214 to provide a complete output video signal 46 that includes illuminated and non-illuminated scenes.

It is apparent then from the above description of the operation of the apparatus 10 that the problems associated with previous low-light video sensors have been overcome. In particular, the apparatus 10 is insensitive to variations in optical component characteristics from various units. In other words, the apparatus 10 can compensate for variations in its optical and electrical components over a period of time as these components are subject to wear and degradation. The apparatus 10 is also advantageous in that it optimizes the signal-to-noise ratio by maximizing the photocathode pulsewidth before increasing the micro-channel plate gain. In production, this minimizes production alignment procedures required for the high voltage power supply circuit included within the controller 50. The apparatus 10 also provides greater stability for when the sensor assembly is required to view rapidly changing scenes.

Thus, it can be seen that the objects of the invention have been satisfied by the structure presented above. It should be apparent to those skilled in the art that the objects of the present invention could be practiced with any type of lens and image intensification tube.

While the preferred embodiment of the invention has been presented and described in detail, it will be understood that the invention is not limited thereto or thereby. Accordingly, for an appreciation of the true scope and breadth of the invention, reference should be made to the following claims.

What is claimed is:

1. An automatic exposure and gain control for a sensor using video feedback, comprising:

a sensor assembly viewing a scene and generating a video signal, said sensor having at least two adjustable variables, wherein said sensor assembly comprises a lens for viewing the scene for conversion to an image, said lens having an adjustable iris, wherein said adjustable iris is one of said adjustable variables, an image intensification tube for receiving and brightening said image, wherein said image intensification tube comprises a photocathode for converting said image from a plurality of photons to a plurality of electrons, said photocathode having an adjustable gate pulsewidth that is one of said adjustable variables, a micro-channel plate for multiplying said plurality of electrons, said micro-channel plate having an adjustable micro-channel plate gain that is another of said adjustable variables, and a phophor screen for converting said multiplied plurality of electrons to a mutiplicity of photons;

sensor electronics for receiving said image for conversion to said video signal; and a controller receiving said video signal and deriving an average video value which is compared to a desired average video value, said controller adjusting one of said at least two adjustable variables to a minimum value and then adjusting the other of said variables prior to readjusting the one of said variables to equalize said average video value with said desired average video value, wherein said controller adjusts said micro-channel plate gain to a minimal value and adjusts said iris and said photocathode gate pulsewidth prior to readjusting said micro-channel plate gain to obtain said desired average video value.

2. The automatic exposure and gain control according to claim 1, further comprising:

a strobe for illuminating the scene at a predetermined rate; and a processor connected to said strobe and said controller, said processor communicating to said controller when said strobe is to illuminate the scene so that said controller can adjust said at least one adjustable variable accordingly.

3. The automatic exposure and gain control according to claim 2, wherein said sensor electronics comprises:

a fiber optic coupler coupled to said image intensification tube for funneling said multiplicity of photons into a charge-coupled device to generate said video signal.

4. The automatic exposure and gain control according to claim 1, wherein said controller readjusts said micro-channel plate gain and said photocathode gate pulsewidth whenever said strobe is illuminated.

5. An apparatus for enhancing a scene viewed by an image capturing device, comprising:

means for capturing an image having a lens coupled to an image intensifier tube, said lens having an adjustable iris and said image intensifier tube having at least one adjustable variable, said capturing means generating a video signal of said image;

means for controlling said capturing means receiving said video signal for generating an average video value which is compared to a desired average video value, said controlling means adjusting one of said adjustable iris and said at least one adjustable variable to a minimum value and then adjusting the other of said adjustable iris and said at least one adjustable variable prior to readjusting the one of said variables to equalize said average video value with said desired average video value;

means for illuminating the image at a predetermined rate less than a rate at which said capturing means captures the image;

a processor connected to said illuminating means and said controlling means, said processor communicating to said controlling means when the image is to be illuminated so that said controlling means can adjust at least one of said adjustable iris and said at least one adjustable variable accordingly, wherein said image intensifier tube comprises:

a photocathode for converting said image from a plurality of photons to a plurality of electrons, said photocathode having an adjustable gate pulsewidth that is one of said adjustable variables, said adjustable gate pulsewidth ranging from about positive 40 volts to about negative 800 volts:

a micro-channel plate for multiplying said plurality of electrons, said micro-channel plate having an adjustable micro-channel plate gain that is one of said adjustable variables, said adjustable micro-channel plate gain ranging from about negative 550 volts to about negative 950 volts: and a phosphor screen for converting said multiplied plurality of electrons to a multiplicity of photons, wherein said controlling means adjusts said micro-channel plate gain to a minimal value and adjusts said iris and said photocathode gate pulsewidth prior to readjusting said micro-channel plate gain to obtain said desired average video value and wherein said controlling means readjusts said adjustable iris and said micro-channel plate gain and said photocathode gate pulsewidth whenever the image is illuminated.

6. The apparatus according to claim 5, further comprising:

a fiber optic coupler coupled to said image intensification tube for funneling said multiplicity of photons into a charge-coupled device to generate said video signal.

7. A method for maintaining a desired contrast in video imagery, comprising the steps of:

acquiring a plurality of video images of a scene at a first predetermined rate with a sensor having at least two adjustable variables;

determining an average video level from said plurality of video images and a compiled video history;

adjusting one of said at least two adjustable to a minimum value;

adjusting the other of said variables prior to readjusting the one of said variables to compensate for the difference between said average video level and a desired average video level to generate a video signal with a desired contrast level;

compiling said video history from said plurality of video images and the corresponding adjustments made thereto;

determining whether a next acquired image of said plurality of images is to be illuminated by a strobe;

predicting a value for and adjusting to said value said other adjustable variable for when said next acquired image is illuminated by said strobe;

flashing said strobe at a second predetermined rate;

acquiring a second plurality of video images from said sensor during said flashing step;

determining a second average video level from said second plurality of video images and a second compiled video history;

readjusting said other adjustable variable according to the difference between said second average video level and said desired average video level to generate said video signal with said desired contrast level;

compiling said second video history from said second plurality of video images and the corresponding adjustments made thereto;

wherein said acquiring steps comprise the steps of:

providing a lens with a first adjustable variable to view said scene for conversion to a video image;

coupling said lens to an image intensification tube which has a second and a third adjustable variable for brightening said video image;

providing said image intensification tube with a photocathode coupled to a micro-channel plate coupled to a phosphor screen, wherein said second adjustable variable is a photocathode gate pulsewidth and wherein said third adjustable variable is a micro-channel plate gain; and wherein said steps of adjusting and readjusting comprise the steps of:

first adjusting said micro-channel plate gain to a minimal value and then second adjusting said iris and said photocathode gate pulsewidth prior to readjusting said micro-channel plate gain to obtain said desired average video value and wherein said adjustable iris, said micro-channel plate gain and said photocathode gate pulsewidth are readjusted prior to said flashing step.

8. A method for maintaining a desired contrast in video imagery, comprising the steps of:

generating a video signal of a scene;

flashing a light source on the scene at a predetermined rate;

determining an average video level from said video signal;

splitting said average video level into a first and a second average video level;

receiving said first average video level in an illuminated estimator which generates an illuminated output signal based on ambient light levels and an estimated light level when said light source is flashed;

receiving said second average video level in a non-illuminated estimator which generates a non-illuminated output signal;

combining said illuminated output signal and said non-illuminated output signal in a multiplexer to generate an output signal; and adjusting at least two variables employed in generating said video signal based upon said output signal.

9. The method according to claim 8 further comprising the step of:

adjusting one of said variables to a minimal value and then adjusting the other of said variables prior to readjusting one of said variables to obtain a desired contrast in said video signal.

10. The method according to claim 9 further comprising the step of:

providing a sensor for generating said video signal, said sensor having an image intensification tube with a photocathode coupled to a micro-channel plate coupled to a phosphor screen, wherein said one variable is adjustment of gain of said micro-channel plate.

* * * * *